Feb. 24, 1925.
A. HUWILER
1,527,685
ROTARY MOTOR OR PUMP FOR HYDRAULIC GEARS
Filed April 3, 1922
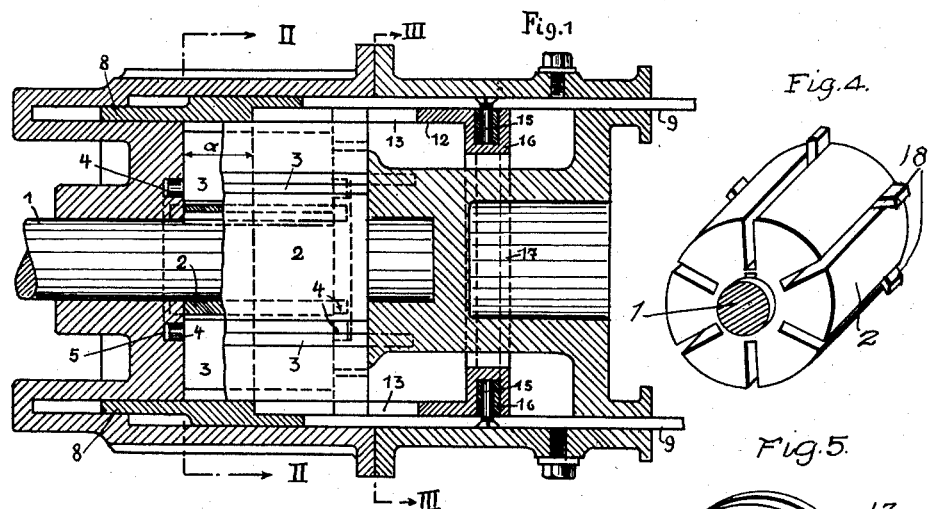
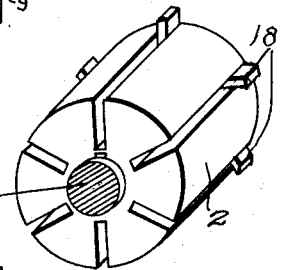
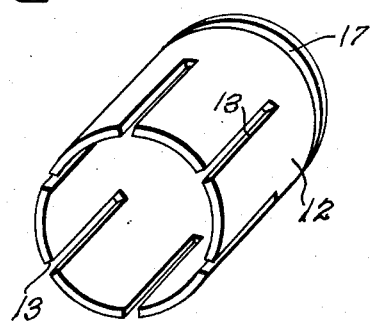
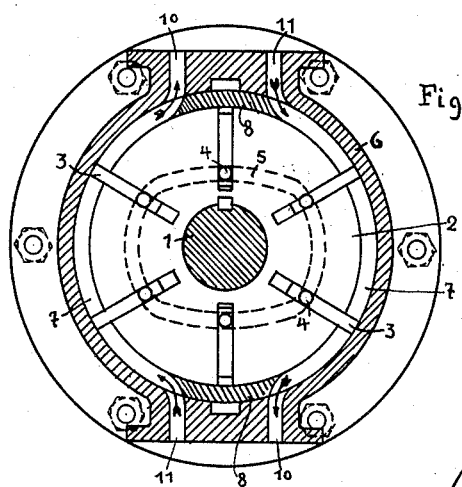
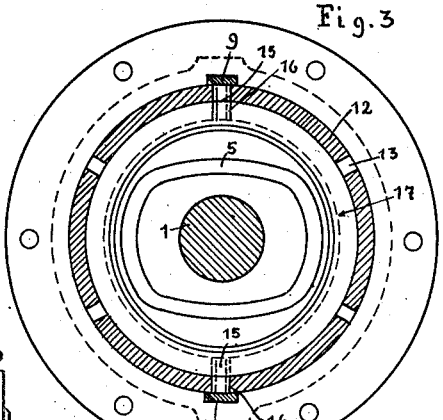
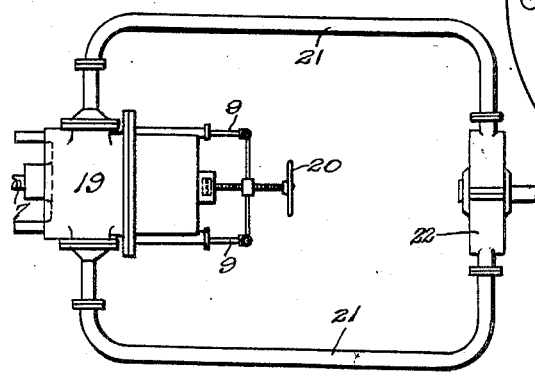
Inventor:
ANTON HUWILER Patented Feb. 24, 1925.

1,527,685

UNITED STATES PATENT OFFICE.

ANTON HUWILER, OF BASEL, SWITZERLAND.

ROTARY MOTOR OR PUMP FOR HYDRAULIC GEARS.

Application filed April 3, 1922. Serial No. 549,278.

*To all whom it may concern:*

Be it known that I, ANTON HUWILER, engineer, citizen of the Swiss Republic, residing at Basel, Switzerland, have invented certain new and useful Improvements in Rotary Motors or Pumps for Hydraulic Gears, of which the following is a specification, reference being had therein to the accompanying drawing.

The invention relates to improvements in rotary motors or pumps for hydraulic transmission gears and of the type in which means are provided for varying the capacity of the motor or pump by varying the amount of the impellers operatively exposed, which improvements enable a high efficiency to be obtained at all the transmission ratios and further a continuous variation of the speed as well as a corresponding increase or decrease of the turning moment.

When utilizing only mechanical elements, a continuous change of speed and a corresponding change of the turning moment can only be effected in a very uneconomic manner and with small forces. The electric transmission requires expensive and heavy installations which work at a low efficiency at most speeds, so that this method of transmission can only be applied on a larger scale where electric energy is available. Furthermore, methods for hydraulic power transmission are known which can be divided into two groups, the one in which the kinetic energy of the liquid is utilized and the other in which use is made of the static energy contained in the liquid. The first group shows a very steep efficiency curve for the various speeds, so that a good efficiency is only obtained within comparatively small limits of the speed. Furthermore, the turning moment cannot be changed in a manner which meets practical requirements, so that this method of transmission cannot be adopted, for instance, for vehicles. The second method is generally carried into effect by means of rotary pumps, whereby a variation of the speed may be obtained by connecting, in parallel, several rotary pumps or by by-passing part of the motive fluid. With the first mentioned installations only few steps of speed can be provided and there is no gradual change from one speed to another. With the second arrangement, the energy of the liquid current that is directly returned to the pump is destroyed and lost and the working therefore not economical and further the turning moment cannot be varied and, as a matter of fact, most of the power absorbing devices which call for a variable speed require also a variation of the turning moment. At high speeds the rotation of several rotary pumps running empty is disadvantageous.

The object of the present invention is to design a motor or pump for hydraulic transmission gear by which the above mentioned objections are overcome and it is of special importance for vehicles driven by primemovers the speed of which can only be varied in a very limited degree and which give a constant turning moment such as turbines, internal combustion engines, electric motors. The transmission gear according to the present invention applied to vehicles affords a transmitting of power having a high efficiency and is adapted to all the various working conditions.

The device according to the invention consists of a rotary engine which may operate as a driven machine, viz, as pump as well as a driving motor, and in which engine the working space through which the liquid passes can be increased or diminished within predetermined limits by an axially adjustable sleeve to vary the output of the engine.

One embodiment of the invention is illustrated on the accompanying drawings, in which:

Fig. 1 is a longitudinal section through the rotary engine.

Fig. 2 is a cross-section along line II—II of Fig. 1.

Fig. 3 is a cross-section along line III—III of Fig. 1.

Figs. 4 and 5 are details shown in a perspective view and

Fig. 6 is a plan view illustrating a general arrangement of the transmission gear.

In the accompanying drawings, 1 designates a shaft to which the drum 2 is rigidly secured so that the latter rotates with the shaft. Radially disposed vanes 3 are slidably arranged in slots provided in the body of the drum 2, the radial movement of said vanes 3 being controlled by means of bolts 4 mounted on said vanes and moving along guideways 5. The latter consist of ovoid grooves recessed in the casing 6 at each end of the vanes and serve to control the centrifugal forces acting on the vanes and to generally determine the extent of the radial travel of same. The casing 6 which is preferably bi-partite, concentrically surrounds the drum 2, an annular space 7 between the casing 6 and the drum 2 forming the working space into which the vanes 3 project. The working space 7 is subdivided into two compartments by means of two separating members 8 which can be displaced in the axial direction by means of rods 9 rigidly fixed to or integral with said members. The ovoid or elliptical shape of the guideways 5 causes the vanes to pass inside the members 8 which block up the annular working space 7 and divide the latter into two compartments, each having a separate inlet passage 11 and an outlet passage branch 10. Inside the casing 6 there is also arranged a sleeve 12 having a radial thickness that corresponds approximately to the radial width of the annular working space 7. The sleeve 12 rotates with the drum 2 and is movable in an axial direction into the annular working space 7 whereby the length of the latter in an axial direction can be varied and the part occupied by the sleeve 12 is cut out from the annular working space 7 and the latter is correspondingly reduced. In Fig. 1 the sleeve 12 is shown projecting into the working space leaving an operative working space of the width indicated by a. To enable the sleeve 12 to be adjusted axially, the latter is provided throughout a part of its length with slots 13 (Fig. 5) into which the vanes 3 project. The sleeve 12 is moved by means of pins 15 provided with anti-friction rollers 16 projecting into a circular recess 17 of the sleeve 12, the pins 15 being screwed into the rods 9 so that upon a movement of the rod, a corresponding movement of the sleeve 12 is produced. To prevent escape of the liquid through the slots 13, projections 18 are provided on the drum 2 ((Fig. 4) which projections extend into the said slots and form end walls or closures, and close the slots against the escape of liquid.

Fig. 6 illustrates the general arrangement of the hydraulic transmission gear. 19 designates the rotary engine of the type described above, driven by the shaft 1. By means of the hand wheel 20 the rods 9 and the sleeve can be pushed for a greater or less distance into the working space or withdrawn therefrom. 21 designates the conduits for connecting up the rotor of the pump, to the driving motor 22, which may be a rotary engine of the usual type.

The manner of operation is as follows:
If the rotary pump 19 be driven from a source of power running at a constant speed and exerting a constant turning moment, for instance from an alternating motor of the squirrel cage type, the pump draws a determined quantity of liquid to which a determined pressure may be imparted corresponding to the turning moment of the motor. The amount of energy contained in the liquid current is then transformed into useful work in the rotary engine 22. If now the working space within the rotary pump 19 be diminished by pushing the sleeve into said space upon actuating the hand wheel 20 the quantity of liquid passing the pump which continues to run at the same speed is smaller, therefore the rotary engine 22 will rotate at a less speed as the quantity of liquid consumed per one revolution remains constant. The source of energy delivers, however, the same turning moment and it is thus made possible to impart to the current of liquid a higher pressure. The high liquid pressure acts on the same area of the vanes in the motor 22 and thus raises its peripheral force, i. e., the turning moment.

These facts may be illustrated by the following specific example: Let it be assumed that the rotary pump is driven by a primemover and a peripheral speed of 10 meters per second of the liquid in the working space and a peripheral force of 40 kilograms acting on the vanes result. If the working space has a cross-sectional area of 4 square centimeters, the liquid leaves the pump with a specific pressure of 10 atmospheres. If the motor is of similar dimensions, a peripheral speed of 10 meters per second and a peripheral force of 40 kilograms is obtained therein, the losses occurring upon the transmission not being taken into account.

If now the sleeve is further projected into the working space of the pump and if said space is thereby reduced to 2 square centimeters, the pump actuates only half the quantity of liquid whilst running at the same speed, the motor 22 will thus run only at half the number of revolutions as in the previous case. The peripheral force of 40 kilograms on the vanes of the pump remains the same and as this force acts now upon an area of two square centimeters only the specific pressure imparted to the liquid current will be 20 atmospheres. In rotary engine 22, this specific pressure of 20 atmospheres acts upon the cross-sectional area of the working space, i. e., on 4 square centimeters and the peripheral force exerted is increased to 80 kilograms, that is to say, to double the amount of the previously mentioned case. The total amount of energy remains of course the same as the velocity is reduced to one half.

In certain cases it may prove advantageous to have the motor built in the manner described above for the pump, so that the motor may be controlled in a similar manner to that described above with the pump.

The details of the construction may of course be modified in many ways without departing from the scope of the present invention:

What I claim as my invention and desire to secure by Letters Patent, is:

1. A rotary motor or pump of the radial vane type for hydraulic gears, comprising a case, a drum therein fixed to a shaft, a bipartite annular working space surrounding said drum, axially adjustable separating members subdividing the working space, and an axially adjustable sleeve in said annular working space and turning with the drum.

2. A rotary motor or pump of the radial vane type for hydraulic gears, comprising a case, a drum therein fixed to a shaft, a bipartite annular working space surrounding said drum, two axially adjustable separating members subdividing the working space into two compartments, each having a separate inlet and outlet, and an axially adjustable sleeve in said annular working space and turning with the drum.

3. A rotary motor or pump of the radial vane type for hydraulic gears, comprising a case, a shaft, a drum therein fixed to the shaft and having slots, a bipartite annular working space surrounding said drum, two axially adjustable separating members subdividing the working space into two compartments, each having a separate inlet and outlet radially disposed vanes slidable in said slots and projecting into said working space, an axially adjustable sleeve projecting into said annular working space and turning with the drum and having axial slots into which said vanes project, and projections in the rear portion of the drum slidable in the slots of the sleeve and forming closures for the same.

In testimony whereof I have affixed my signature.

ANTON HUWILER.